J. T. QUIGLEY.
RECORDING MACHINE.
APPLICATION FILED JUNE 6, 1913.

1,249,192.

Patented Dec. 4, 1917.
6 SHEETS—SHEET 1.

Witnesses.
Robert H. Kamerer.
Horace A. Crossman.

Inventor.
John T. Quigley.
by Emery, Booth, Janney & Varney.
Attys.

J. T. QUIGLEY.
RECORDING MACHINE.
APPLICATION FILED JUNE 6, 1913.
1,249,192.
Patented Dec. 4, 1917.
6 SHEETS—SHEET 2.
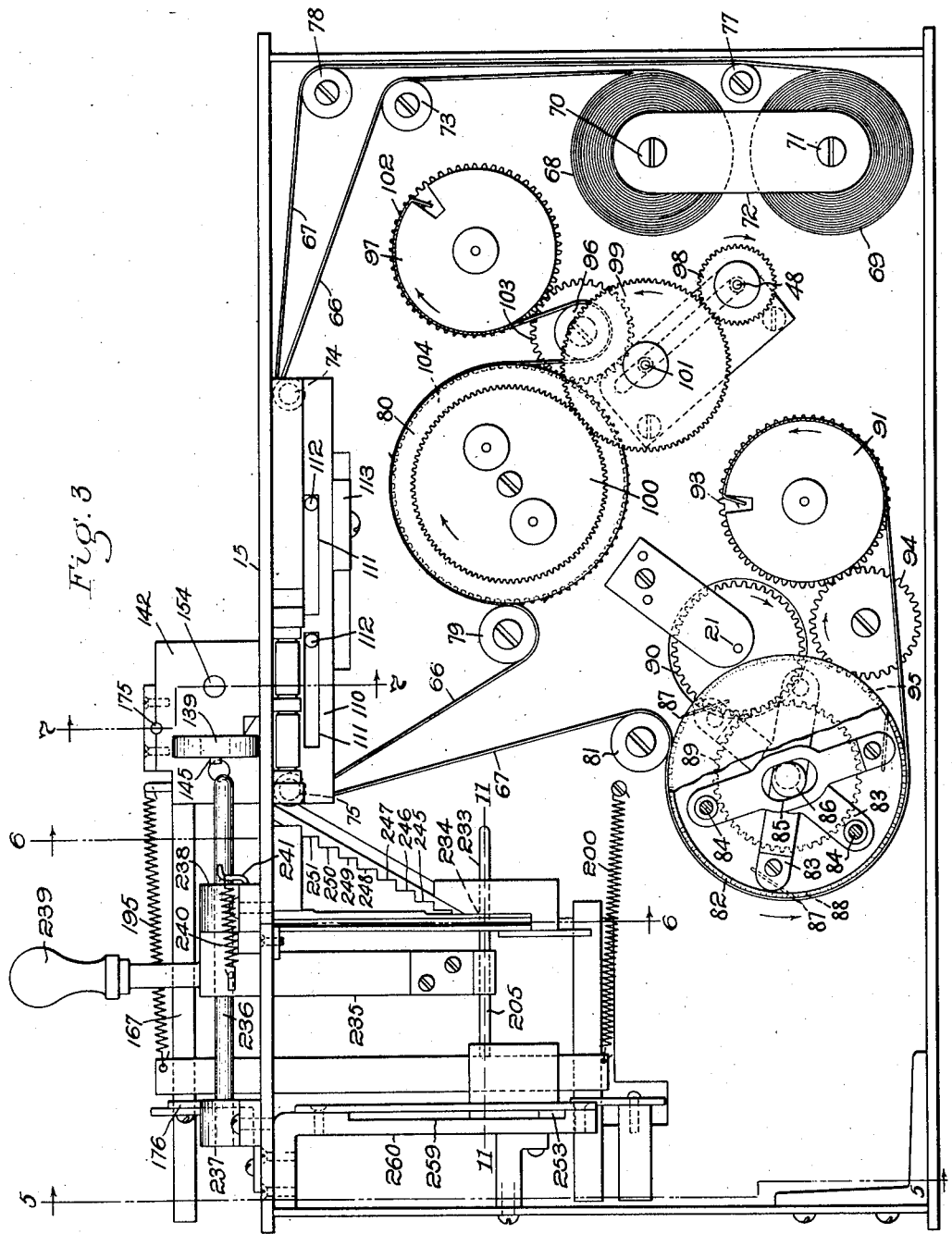
Witnesses.
Robert H Hammler
Horace A Crossman
Inventor:
John T. Quigley.
by Emery Booth Janney & Varney
Attys.

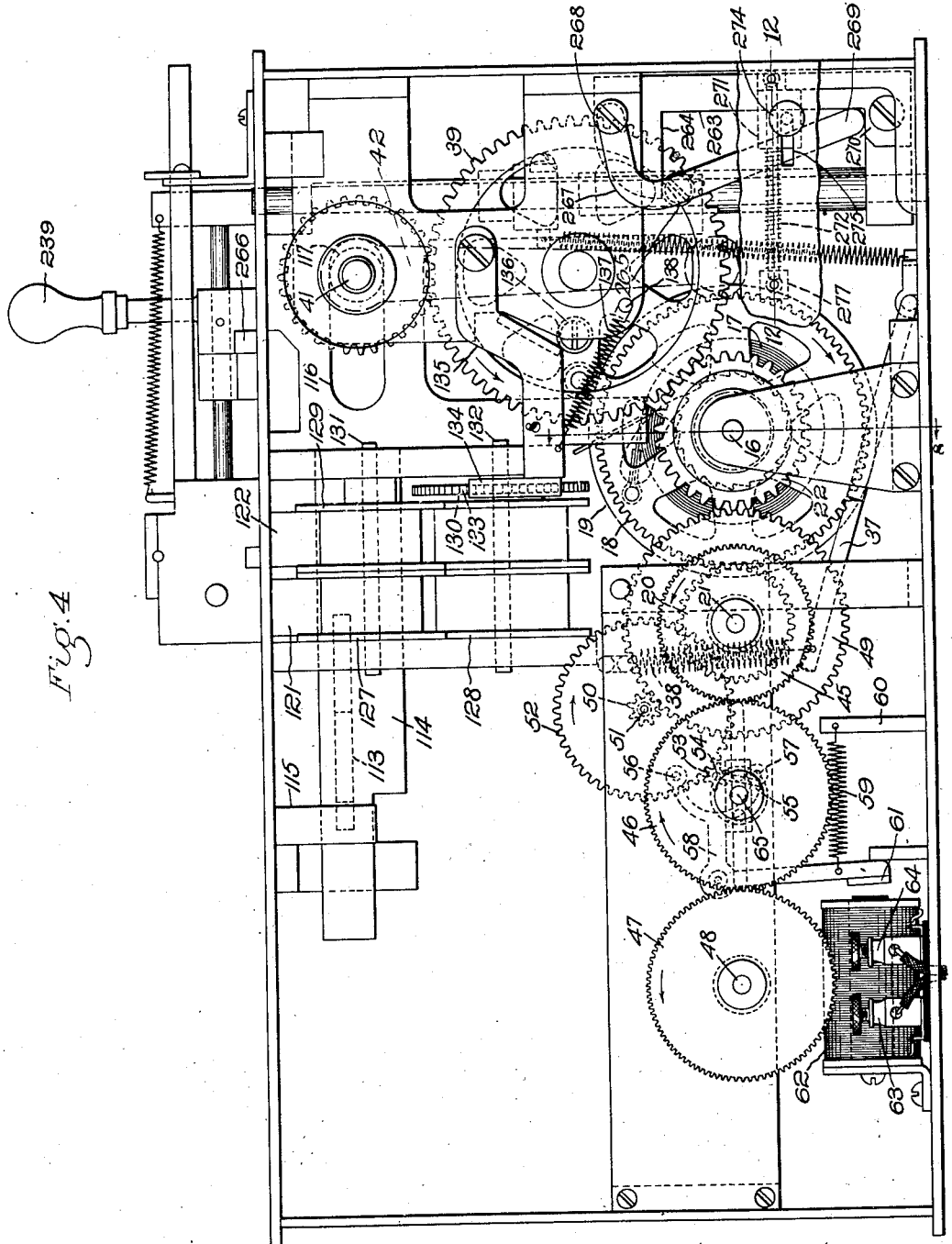

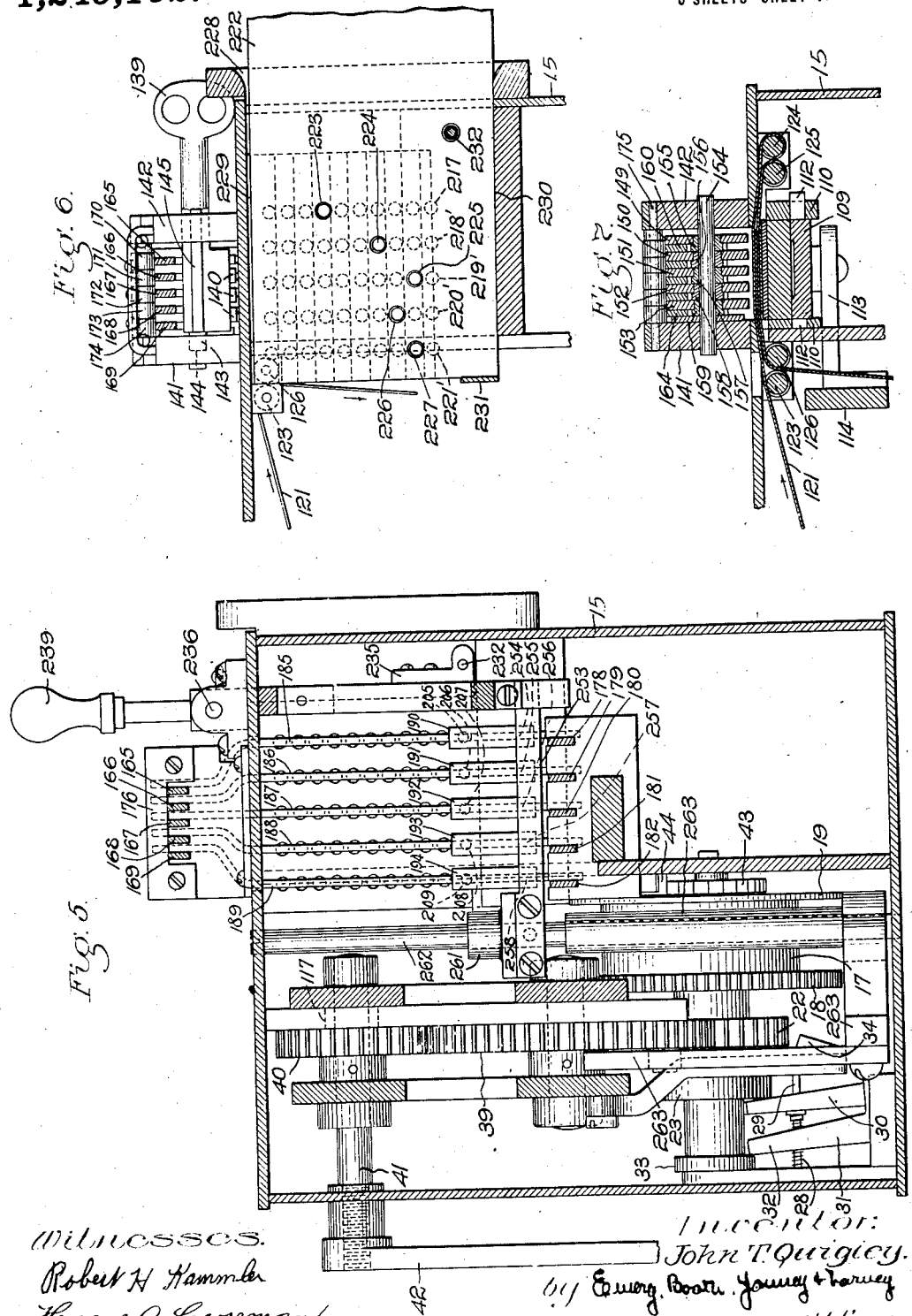

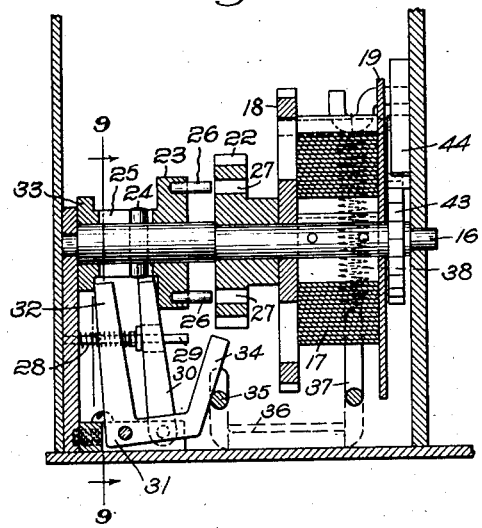
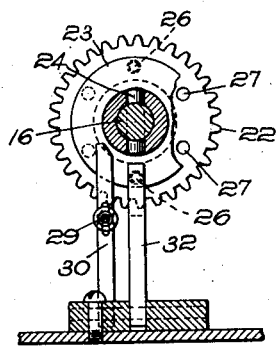

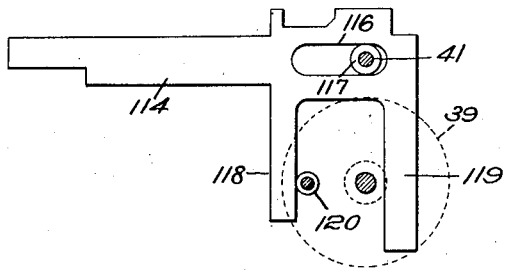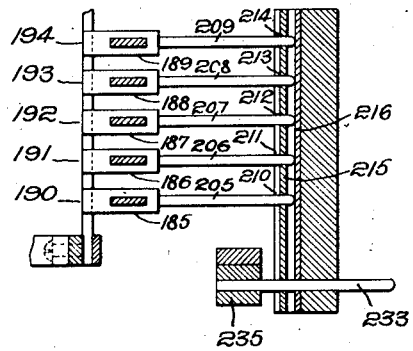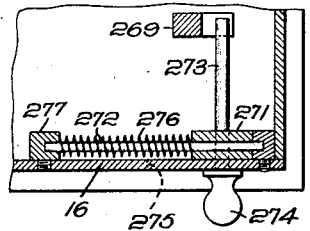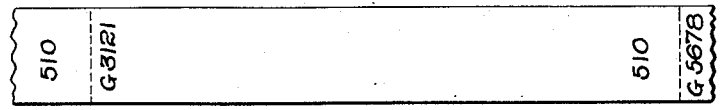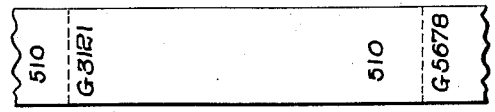

UNITED STATES PATENT OFFICE.

JOHN T. QUIGLEY, OF BOSTON, MASSACHUSETTS, ASSIGNOR, BY MESNE ASSIGNMENTS, TO THE COSTMETER COMPANY, OF BOSTON, MASSACHUSETTS, A CORPORATION OF MASSACHUSETTS.

RECORDING-MACHINE.

1,249,192.   Specification of Letters Patent.   Patented Dec. 4, 1917.

Application filed June 6, 1913.   Serial No. 772,051.

*To all whom it may concern:*

Be it known that I, JOHN T. QUIGLEY, a citizen of the United States, and a resident of Boston, county of Suffolk, and State of Massachusetts, have invented an Improvement in Recording-Machines, of which the following description, in connection with the accompanying drawings, is a specification, like characters on the drawings representing like parts.

This invention relates to recording machines, and more especially, though not exclusively, to machines for making record of costs in manufacturing establishments, and when so used is capable of recording wage cost, as well as overhead cost.

My invention will be best understood by reference to the following specification, when taken in connection with the accompanying drawings showing one illustrative embodiment thereof, while its scope will be more particularly pointed out in the appended claims.

In the drawings:

Fig. 3 is an elevation viewed from one side of the machine, with the side wall or cover of the machine removed, and the casing of one of the tape-feeding drums partly broken away to show the mechanism;

Fig. 4 is an elevation viewed from the side of the machine opposite Fig. 3, with a portion of the side wall of the casing removed, a portion of the latter being shown to better illustrate the locking device;

Fig. 5 is a detail sectional view on line 5—5 of Fig. 3;

Fig. 6 is a detail sectional view on line 6—6 of Fig. 3, showing the workman's key and job tag inserted ready for a printing operation;

Fig. 7 is a detail sectional view on line 7—7 of Fig. 3;

Fig. 8 is a detail sectional view on line 8—8 of Fig. 4;

Fig. 9 is a detail sectional view, partly broken away, on line 9—9 of Fig. 8;

Fig. 10 is a detail elevation at a reduced scale, illustrating the platen-actuating slide and the roller which serves to reciprocate the slide;

Fig. 11 is a detail plan section on line 11—11 of Fig. 3;

Fig. 12 is a detail plan section on line 12—12 of Fig. 4;

Fig. 13 is a detail plan, full-size, of an illustrative example of a portion of the total cost tape; and Fig. 14 is a detail plan, full size, of an illustrative example of a portion of the wage cost tape, such portion corresponding to and forming a part of the same recording operation as the portion of the total cost tape shown in Fig. 13.

Figure 1:
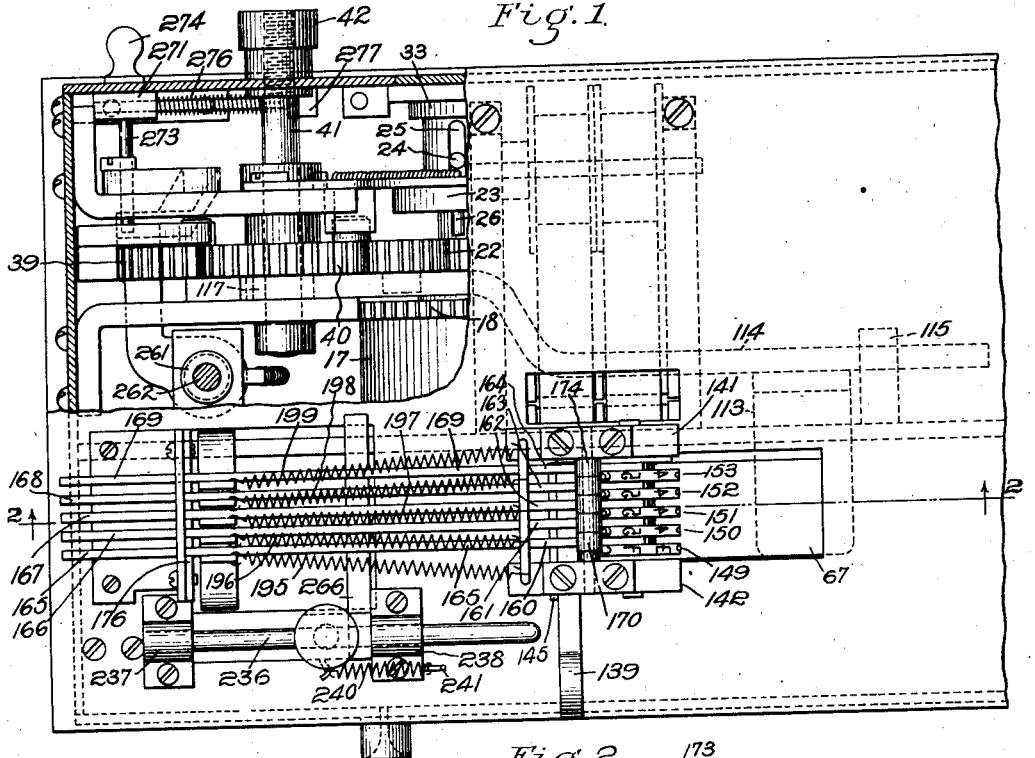
Figure 1 is a plan of a portion of a recording machine embodying my invention, the top plate of the casing being partly broken away to expose some of the mechanism.

Referring to the drawings, and to the embodiment of my invention which I have selected for illustrative purposes, 15 is a casing forming a supporting frame for the various working parts, as well as constituting a housing for such parts as it may be desirable to render inaccessible to the workman. The casing also serves to protect the mechanism from dust and dirt, as well as to prevent its mechanism from being tampered with by unauthorized persons.

In describing the machine and its mode of operation, it will be convenient to first describe each mechanism separately, and then describe their general operation and coöperative action.

*Power train and re-winding mechanism,*
(Figs. 4, 8, and 9.)

Power may be supplied by any suitable driving means, but herein a main driving shaft 16 is driven by a spring 17, having one end secured to said shaft, and its other end to a gear 18 and flange 19 loosely mounted on said shaft. This gear meshes with and drives a gear 20, secured to an arbor 21, journaled in suitable bearings. Power is taken from this arbor to drive the time train, and the tape mechanism hereinafter described.

While the spring may be wound by any other suitable mechanism, it is herein wound and re-wound from time to time by the workman, as he operates the machine to make a record. This provides a convenient and effective way to re-wind the spring, without giving it any special thought or attention, since its re-winding is merely incidental to the recording operation. As herein shown, four such re-windings of the spring suffices for much more than one working day. Hence, if the workman operates the machine but four times each day, the spring will be sufficiently wound. It will be evident, however, that if the machine should be operated several times in excess of four, each day, it will be necessary to provide some means to prevent over-winding of the spring.

To these ends, a gear 22, constituting also a clutch member loosely mounted on a main driving shaft 16, but held against longitudinal movement thereon, coöperates with a clutch member 23 mounted to slide longitudinally of said shaft, but held against rotation thereon by suitable means, herein a pin 24, located in a slot 25 provided in a clutch member 23. The clutch members may be provided with any suitable interengaging means, but herein the member 23 is provided with a plurality of pins 26, while the member 22 is provided with corresponding holes 27 to receive said pins. These pins and holes are so arranged that the clutch members are capable of interengaging at a plurality of relative positions.

A spring 28, acting through a pin 29 and lever 30, constantly tends to urge the clutch member 23 into engagement with the clutch member 22. The clutch member 23, however, is normally held out of such engagement by a lever 31, having one arm 32 engaging a flange 33 on the clutch member 23, and having another arm 34 engaging one arm 35 of a U-shaped lever 36. The latter is provided with a second arm 37 engaging the periphery of the spring 17, and held in engagement therewith by a spring 38. This provides a means for regulating the relative location of the clutch members by the spring 17, so that when the latter unwinds to a predetermined extent, the clutch members are brought into driving engagement.

The gear 22 meshes with an intermediate gear 39, and the latter in turn meshes with a gear 40, secured to a shaft 41. Secured to this shaft is a hand crank 42, preferably threaded onto the shaft in such a manner that rotation of the crank in the proper direction to operate the machine tends to screw the crank onto the shaft, and bind the two together, while reverse rotation of the crank serves merely to unscrew the crank from the shaft, without causing any injury to the machine.

It will be evident that when the spring has unwound to a certain predetermined extent, and the clutch members are thereby placed in driving engagement, the next time the machine is operated by the workman turning the crank 42, such motion of the crank will act through the described mechanism to rotate the shaft 16, and thereby wind the spring. As is customary with spring motors, the driving shaft 16 is provided with a ratchet 43, with which a suitable spring-pressed pawl 44 engages. Said spring and pawl serve to prevent reverse rotation of the driving shaft.

*Time train.* (See Fig. 4.)

Secured to the arbor 21 is a gear 45, meshing with a gear 46, the latter in turn meshing with a gear 47, secured to the shaft 48. The purpose of this train of gears just described, and the shaft 48 driven thereby, will be explained hereinafter.

Secured to the arbor 21 is a gear 49, meshing with a pinion 50, the latter being secured to a shaft 51, to which shaft is also secured a gear 52. The gear 52 meshes with and drives a pinion 53, secured to a shaft 54. The gearing just described constitutes a time train, which may be provided with any other suitable escapement, but is herein controlled by an electric escapement mechanism. This escapement is fully shown and described in my prior Patent 1,139,718 granted May 18, 1915, and as its features are comparatively of little importance in the present application, it will be unnecessary to describe the mechanism with great particularity. The escapement mechanism comprises generally a pin 55, secured to the pinion shaft 54, and adapted to engage either of two stop pins 56 and 57 carried by two arms of a forked bell crank lever 58. As this lever is oscillated the pin 55 is released by the pin 57, and is driven by the described gearing until it strikes the pin 56, after which the latter pin is carried in the opposite direction, and releases the pin 55, whereupon the latter again strikes and is stopped by the pin 57 in its initial position. A suitable spring 59, secured at one end to the lever 58 and at its other end to a fixed support 60 serves normally to hold the lever 58 in the position shown in Fig. 4. Secured to the lever 58 is an armature 61, arranged to coöperate with a suitable electromagnet 62, having terminals 63 and 64, each in practice being connected in circuit with a master clock, which latter will serve to send impulses at intervals of one minute to the magnet, thereby operating the escapement at one minute intervals. By this means, the time train is driven at a predetermined speed under the influence of a clock. The speed of the shaft 48 may, of course, be changed by changing the ratio of the gears 47 and 46, the latter for this purpose being preferably mounted on an adjustably mounted stud 65.

Figure 2:
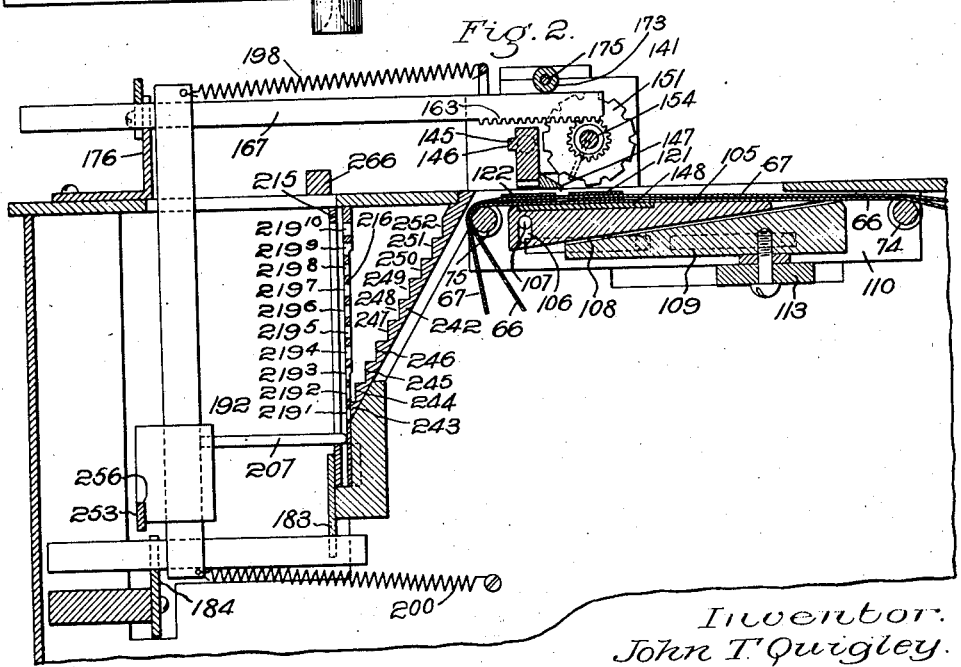
Fig. 2 is a detail sectional view on line 2—2 of Fig. 1.

*Tape mechanisms*, (Figs. 1, 2, and 3.)

Herein the machine makes its records upon two tapes 66 and 67, preferably consisting of strips of paper, this material having been found to be most satisfactory for the purpose, as it is little affected by temperature and weather conditions. It will be convenient to refer to the tape 66 as the "wage tape," and the tape 67 as the "total cost tape," since the mechanism is particularly intended and adapted to record upon the wage tape the wage cost, and to record upon the total cost tape the wage cost plus overhead charges. Herein the wage tape leads from a supply roll 68, and the total cost tape leads from a similar supply roll 69, both of which rolls may be suitably mounted on spindles 70 and 71, respectively, and held in place thereon by any suitable means, as for example an adjustable plate 72. The wage tape 66 is led from the supply roll 68 around an idle roller 73, from whence it passes across two guide rollers 74 and 75, located at opposite sides of a suitable platen, hereinafter described. The total cost tape is led in a similar manner from the supply rolls 69, and is guided by idle rollers 77 and 78, from which latter it is led across the guide rolls 74 and 75.

After passing across the platen, the tapes 66 and 67 may be fed by any suitable mechanism, but herein the tape 66 extends part way around an idle roller 79, whence it passes to a feeding drum 80, while the tape 67 in a similar manner passes part way around an idle roller 81, whence it passes to a feeding drum 82. The feeding drums 80 and 82 are similar to a feeding drum forming the subject matter of my co-pending application, Serial No. 678,675, filed February 19, 1912. The mechanism of the drum 80 is identical with that of the drum 82, and accordingly a detailed description of the latter will suffice for both. The drum 82 is hollow, and has mounted therein a plurality of levers 83, herein three, mounted on pivots 84. Each of these levers is provided with a slot 85, which receives an eccentric 86. This eccentric, although it may be adjustable, is fixed in the operation of the machine, and hence as the drum rotates, carrying with it the levers, the latter will be oscillated on their pivots 84. Each of the levers 83 carries at its swinging end a pin 87, suitably secured thereto and extending through a suitable slot 88, in the circumferential wall of the drum 82. These pins, which are intended to enter the paper tape and insure its positive feeding movement, are placed angularly with respect to the periphery of the feed drum, and their points are inclined in the direction in which the drum rotates.

It will now be evident that by properly adjusting the eccentric 86, the feed pins may be caused successively to enter the paper tape at the point where the latter leads onto the drum, and to withdraw from the paper tape at the point where the paper tape leads off the drum. By this means, the feeding pins are caused to enter and leave the paper tape without tearing the same, and are caused to impart a positive and accurate feeding movement to the tape. The feeding drum 82 may be driven by any suitable mechanism, but herein a gear 89 secured to the drum meshes with, and is driven by, a gear 90 secured to the spindle 21, hereinbefore described. If desired, the tape, after leaving the feeding drum 82 may be wound onto a winding drum 91, frictionally driven by a gear 93, driven by an intermediate gear 94, the latter in turn being driven by a gear 95 secured to the drum 82. The winding drum 91 will, in practice, be driven from the gear 93 by some suitable form of frictional driving means, permitting a slipping driving connection between the two to allow for a constantly increasing diameter of the roll of tape wound onto the winding drum. I find in practice, however, that the length of tape which feeds through the machine in a working day is so small that the winding drum may be dispensed with altogether, and the tape, after it leaves the feeding drum, may be allowed to drop into the bottom of the casing of the machine.

Referring now to the feeding and winding mechanism for the wage tape 66, the latter passes part way around the feeding drum 80, thence around an intermediate idle roller 96, and is wound onto a winding drum 97. The feeding drum 80 receives its motion from the shaft 48, hereinbefore described, through a gear 98 secured to said shaft and meshing with an intermediate gear 99, the latter in turn meshing with a gear 100 secured to the feeding drum. In order to vary the rate of feed imparted to the tape by the drum 80, the ratio of the gears 98 and 99 may be changed, the latter for this purpose being mounted on an adjustable stud 101. The winding drum 97 is frictionally driven by a gear 102 meshing with an intermediate gear 103, the latter in turn being driven by a gear 104, secured to the feeding drum 80. In this case, also, the winding drum is not essential, but may be altogether dispensed with in practice, in which case, the tape will simply pass from the feeding drum into the lower part of the casing of the machine.

*Printing mechanism*, (Figs. 1 to 7, inclusive.)

Located between the guide rollers 74 and 75 is a platen 105, which in the present instance is mounted to move vertically, and to that end may be provided with a vertical slot 106, in which is located a fixed pin 107. The platen may be moved vertically for the purpose of making the depressions by any suitable mechanism, but herein is provided on its under side with an inclined surface 108, engaged by a horizontally sliding wedge 109 mounted in suitable guideways in the frame 110, the side members of the latter for this purpose being provided with horizontal slots 111, which receive pins 112 secured to the wedge.

A horizontally reciprocatory motion may be imparted to the wedge 109 by any suitable mechanism, but herein the wedge is secured by means of a bracket 113 to a wedge-carrying slide 114. The latter is guided at one end in a suitable guide 115, and at its other end is provided with a horizontal slot 116, which receives a bushing 117 on the shaft 41, and serves also as a guide for said slide. Referring more particularly to Fig. 10, this slide is provided with a jaw in the form of two rigid depending arms 118 and 119, adapted to be alternately engaged by a roller 120 journaled on the gear 39 hereinbefore described. The rotation of the gear, therefore, serves to impart the necessary reciprocating motion to the slide, and the platen-lifting wedge carried thereby, at appropriate intervals in the operation of the machine. By this means, the platen is raised and lowered into and out of coöperation with the printing wheels, printing key, and scoring device hereinafter described.

As a means for supplying ink for the printing operation, I preferably employ two ink ribbons 121 and 122, the first serving for the printing wheels, and the second serving for the printing key. In order that the characters may be printed on the tape 66, as well as the tape 67, each of the ribbons extends across the top of the tape 67, and after passing around suitable guide rolls, extends between the tape 67 and the tape 66, so that in each case, a single ribbon serves to cause the characters to be printed on both tapes. Referring to Fig. 7, the arrangement of the ink ribbon 121 is clearly shown. By reference to this figure, it will be seen that the tape passes over a roller 123, across the tape 67, part way around the rollers 124 and 125, and thence between the tapes 66 and 67, after which the ribbon passes part way around a roller 126. One end of the ribbon is wound on a winding spool 127, while the other is wound on a winding spool 128. The ribbon 122 is guided by an exactly similar arrangement of guide rollers, and its ends are wound upon winding spools 129 and 130. Herein, the winding spools 127 and 129 are mounted on a shaft 131, while the winding spools 128 and 130 are mounted on a shaft 132, the latter being driven by suitable means, herein a ratchet 133 and a pawl 134. This pawl is herein carried by a lever 135, engaged by a roller 136 journaled on the gear 39, hereinbefore described. A spring 37, secured at one end to the lever 135 and at its other end to a fixed pin 138, serves to retract the lever and pawl after the same have been lifted by the roller 136. By this means, a gradual feeding motion is imparted to the two ink ribbons, inasmuch as the gear 39 rotates once with each registering operation of the machine. While the ink ribbons may be of the same color, they are preferably of different colors, and preferably, though not necessarily, the ribbon for the key is red, while that for the printing wheels is black I will now describe the workman's key, by means of which the workman's number is printed on the two tapes. A member 139, which I will call a key, since it is similar in its general form to an ordinary door key, is provided with one or more types 140, preferably in the form of numerals, serving to denote the workman's number. This key may be provided with any suitable means to position and hold the same in its proper position to cause the numerals to be printed on the two tapes, when the platen is pressed forcibly upward against the types on the key. Herein, the machine is provided with a pair of uprights 141 and 142, one of which is provided with a circular hole 143 to receive a cylindrical boss, or projection, 144 on the end of the key, while the latter is provided with a rib 145 which passes through a slot 146 in the upright 142, and serves to hold the key against rotation when properly inserted in its place. It will be understood, however, that these positioning means for the key are merely typical, and may be altered within the spirit and scope of my invention.

As a means for scoring the tapes with transverse lines, I may provide a scoring blade 147, which may operate in any practicable manner to score the tape simultaneously with each printing operation. In the present instance, this scoring knife 147 is mounted in fixed position between the uprights 141 and 142, so that it coöperates with the platen as the latter is raised to make an impression. It will be observed that the scoring edge of the knife 147 is placed midway between the adjacent edges of the printing ribbons 121 and 122, so as to score the tapes between the two ribbons. As a means for insuring a firm and uniform pressure when the platen is raised, the latter may be provided with a yielding impression surface 148, herein consisting of a rubber pad, inserted in the upper face of the platen.

I will now describe the printing wheels and their controlling mechanism, by means of which predetermined symbols, or groups of symbols, or characters, may be printed upon the tapes at the same time that the workman's number is printed thereon. These symbols may serve to denote the job which the workman is given to do, and preferably the symbols may consist of numerals forming an arbitrary, predetermined number, which it will be convenient to call the job number. To this end, I may provide one or more printing wheels, herein five, designated by the numerals 149, 150, 151, 152 and 153, mounted on a shaft 154 supported in the uprights 141 and 142. One of the printing wheels, herein the wheel 149, is preferably provided on its periphery with letters a, b, c, d, e, f, g, h, i, j, while the remaining printing wheels are provided on their peripheries with the numeral 1 to 9, inclusive, and 0. Each of the printing wheels is of course provided with a blank space, at its initial position,—that is to say, in the space between the 0 and the 1.

Any suitable mechanism may be provided for shifting the type wheels, to cause a predetermined group of types to be brought to the printing point, and returned to their initial position after the printing operation has taken place. In the present instance, I provide pinions 155, 156, 157, 158 and 159, secured to the printing wheels 149, 150, 151, 152 and 153, respectively. These pinions mesh with racks 160, 161, 162, 163 and 164, respectively. These racks are formed on rack bars 165, 166, 167, 168 and 169, respectively, and are held in proper mesh with their respective pinions by rollers 170, 171, 172, 173 and 174, journaled on a shaft 175 mounted in the housings 141 and 142. The other ends of the rack bars 165 to 169, inclusive, are mounted to slide in a suitable guide 176.

Located at some distance below the rack bars are corresponding horizontal slides 178, 179, 180, 181 and 182, mounted in suitable guides 183 and 184, and rigidly connected to the rack bars, respectively, by vertical members 185, 186, 187, 188 and 189, constituting vertical guides for slides 190, 191, 192, 193, and 194, mounted to slide freely thereon. An upper set of springs 195 to 199, inclusive, and a lower set of springs 200 to 204, inclusive, are secured to the upper and lower ends, respectively, of the vertical guides 185 to 189, inclusive, and constantly tend to urge their respective slides from the initial position shown in Figs. 1, 2 and 3, toward the right. Such movement, however, is normally prevented by locating, or selecting, pins 205 to 209, inclusive, rigidly secured to the slides 190 to 194, inclusive. The pins 205 to 209, inclusive, pass through and are laterally guided in slots 210 to 214, inclusive, formed in a plate 215, while the free ends of said pins normally engage a plate 216. The latter is provided with vertical rows of perforations corresponding to the pins just described, these vertical rows of perforations being designated generally by the numerals 217 to 221, inclusive. In the present instance, the number of holes in each vertical row is the same as the number of characters on the corresponding printing wheel,—that is to say, there are ten perforations in each vertical row. It will be convenient, for purposes of description, to give the individual perforations on each row an additional designation corresponding to its position in such row. For example (see Fig. 2): the perforations of the vertical row 219 have been designated $219^1$ to $219^{10}$, inclusive, the first being the lowermost perforation, and the last being the uppermost. By an examination of Fig. 2, it will be evident that in the absence of any means to cover the perforations in the plate, if the pins were to be advanced in an upward direction, each would enter the lowermost perforation of its respective row under the influence of the described upper and lower springs urging the pins toward the right (Fig. 2). The result would be that the rack connected to and controlled by each pin would move longitudinally a distance equal to the movement of such pin in entering the perforation, and such rack would act through its pinion to move the corresponding printing wheel a certain predetermined portion of a rotation. It will now be evident that by providing means to cover certain of the perforations, while leaving others open to the entrance of the pins, and further by providing means to determine the extent to which each pin shall enter into the perforation, the printing wheels may be shifted, and a predetermined group of characters may be brought to the printing point. To these ends, I provide a perforated controlling pattern member 222, which may be in the form of a tag, having perforations arranged according to some arbitrary scheme and so arranged as to register with a corresponding perforation or perforations provided in the plate 216. This tag may be issued with the job given to the workman, and if desired may be provided with an arbitarary number to designate that job.

The tag, or card, 222 shown in Fig. 6 of the drawings is perforated to give the number G3121, and its perforations are so placed as to cause the mechanism controlled thereby to shift the printing wheels into such a position as to cause the job number "G3121" to be printed on the tapes. To state the purpose more specifically, the card or tag is provided with a perforation 223 adapted to register with the perforation $217^7$, which will control the type wheel 149. The tag is provided with a perforation 224, adapted to register with the perforation $218^4$; it is provided with a perforation 225, adapted to register with a perforation $219^2$; it is provided with a perforation 226, adapted to register with a perforation $220^3$; and it is provided with a perforation 227, adapted to register with a perforation $221^2$.

In order that the tag, or card, may be introduced into the machine, and its perforations caused accurately to register with the proper perforations in the plate, the casing 15 is herein provided with a slot 228, forming an entrance for the tag, and there are provided upper and lower guides 229 and 230 to guide the upper and lower edges, respectively, of the card as the latter is introduced into the machine. The forward motion of the card is limited by a stop 231, engaging the advancing end of the card, preferably adjacent its lowermost corner. As a further means for positioning the card, or tag, and locking the same in place during the printing operation, the card is provided with a locating, or positioning, perforation 232, which receives the positioning pin 233, the latter normally extending into a perforation 234 provided in the plate 216. This positioning and locating pin is herein suitably secured to a rigid depending arm 235 on a horizontal slide 236, the latter being mounted to slide in suitable guides 237 and 238, and being provided with an operating handle 239. A suitable spring 240, secured at one end to the slide 236 and at its other end to a fixed pin 241, constantly tends to maintain the slide, and the locking and positioning pin, in the position shown in Fig. 3. If desired, however, this spring may be omitted. If the spring is used, in order to introduce the card or tag into the machine, it will be necessary first to withdraw the locking and positioning pin by moving the slide toward the left from the position shown in Fig. 3. When the card has been introduced into its proper position, the handle 239 is released, thus allowing the locking pin 233 to enter the perforation 232 under the influence of the spring 240, thus positioning and locking the card. Preferably, the free ends of the pins 205 to 209, inclusive, as well as the pin 233, are rounded to facilitate their entrance into the perforations, as well as to prevent them from unduly wearing the card while traversing the same.

It will now be evident that, if the pins 205 to 209, inclusive, are caused to travel vertically, the pins 207 and 209 will first encounter the perforations 225 and 227, respectively, and will enter the same under the influence of their respective springs; the pin 208 will then continue to advance and enter the perforation 226; the pin 206 will continue to advance, and will enter the perforation 224; and the pin 205 will continue to advance, and will enter the perforation 223.

While the holes in the plate 216, instead of being in the form of perforations, might be made of different depths, to determine the extent to which the pins shall enter therein, in the present instance, I have provided an inclined abutment 242, serving to stop the pins at varying positions, and corresponding to the height of the perforations in which they are located. While the surface of the abutment 242 might be made simply a plane surface placed obliquely, I prefer to provide it with steps 243 to 252, inclusive, having vertical surfaces engaged by the pins at right angles thereto.

As a means for moving the pins 205 to 209, inclusive, in an upward direction, to cause them to travel over the surface of the card or tag, and enter their respective perforations in the latter, I provide a lifting bar 253, normally engaging notches 254 to 258, inclusive, in the slides 190 to 194, inclusive. One end of this lifting bar is mounted to travel in a slot 259, provided in a guide 260 (see Fig. 3), while the other end of the lifting bar is secured to a slide 261 mounted to slide on a vertical guide rod 262 (see Fig. 5). Any suitable means may be provided to lift this slide automatically with each operation of the machine, under the influence of the crank 42, hereinbefore described. In the present instance, this is accomplished by providing a slide 263 mounted to slide on the vertical guide 262, and provided with a horizontally extending lug 264 (see Fig. 4), forming an abutment to engage a roller 265 journaled on the gear 39 hereinbefore described. By rotating the gear in the direction indicated by the arrow thereon (Fig. 4), the roller 265 is caused to engage the lug 264, and thereby lift the slide 263, thus causing the latter in turn to lift the bar 253. When this occurs, the pins 205 to 209, inclusive, are carried in an upward direction, and as they come into register with their respective perforations in the card, they are carried into such perforations, and in this way the slides 190 to 194, inclusive, are disengaged from the lifting bar 253, due to the influence of the upper and lower sets of springs hereinbefore described. It will now be clearly apparent that by placing a tag or card in the machine, the described mechanism may be caused to utilize the gear as a controlling element, by means of which the printing wheels may be individually rotated to whatever extent is necessary to bring the predetermined or selected printing characters thereon into alinement at the printing point, ready to cooperate with the platen so as to print the job number on the tapes. When this has taken place, the several rack bars, with the parts carried thereby, will stand in various positions, according to the extent to which they have been moved. It now becomes necessary to return these parts to their initial positions, ready for another operation. To this end, I may provide any suitable means, but herein the slide 236 carries a horizontal bar 266 (see Figs. 1 and 2) adapted to engage the several vertical guides 185 to 189, inclusive, and carry the same to the left against the tension of their respective springs. The pins 205 to 209, inclusive, are now entirely withdrawn from the perforations in the card or tag, and it becomes necessary to provide for the return of these pins and slides, by which they are carried to their initial positions. To this end, the slides are simply mounted to slide loosely on their respective guides, so that the moment the pins are withdrawn from the perforations, the slides and pins carried thereby will instantly drop to their initial positions, where the slides will engage with the lifting bar 253, ready for another operation. The locking and positioning pin 233 is then withdrawn from its perforation in the card or tag, and the latter is removed from the machine by simply withdrawing it. During the withdrawal or insertion of the card, the unperforated area adjacent the bottom of the latter will simply slide across the rounded ends of the spring-pressed pins.

In order that the printing wheels may be placed closely adjacent one another while at the same time providing a practical mode of operating the same, the several rows of perforations, the spring-pressed pins, and the slides which carry the same, are spaced relatively wide apart, and the main portions of the slides 185 to 189, inclusive, are correspondingly spaced, while the upper terminal portions of these slides converge (see Fig. 5) to permit them to be attached to the rack bars, since the latter have the same spacing as the type wheels.

I preferably provide some suitable means of locking the mechanism of the machine in its initial position, so that it shall be impossible to rotate the hand crank 42 without first operating the locking device to release the mechanism. While I may employ any other suitable means for this purpose, in the present instance, I have provided a dog 267 mounted on a pivot 268, and having a depending arm 269 adapted to engage a locking shoulder 270 on the slide 263 (see Fig. 4). The slide may be unlocked by simply swinging the arm out of engagement with the locking shoulder, so as to permit the slide to be lifted under the influence of the roller 265. In the present instance, I employ for this purpose a slide 271 (see Figs. 1 and 4) mounted to slide on a guide rod 272, and carrying a pin 273 adapted to engage the arm 269 and swing the latter toward the left (Fig. 4). A grasping handle, or knob, 274 located externally of the machine and extending through a slot 275 in the casing 16 serves as a convenient means for manually moving the slide toward the left (Fig. 4). A suitable spring 276, encircling the guide 272, bears at one end against the slide 271, and at its other end against a fixed abutment 277, said spring serving to return the slide to its initial position, after having been moved therefrom by the hand of the operator.

General operation.

In computing the cost of an article of manufacture, three principal factors enter into the total cost, viz:—the price of the raw material or physical elements consumed, overhead cost, and wage cost. The total cost of the article is found by adding these three elements together. The cost of the raw materials is easily determined and we are not concerned with it, in connection with the machine which forms the subject matter of this application. Herein we are concerned only with the element of time, which has a certain definite relation with overhead cost and wage cost. Herein it will be convenient to consider the total cost as being made up of overhead cost plus wage cost. By the use of the two described tapes, I am enabled to make a record of the total cost on one tape, and an independent record of the wage cost on the other tape. I am also enabled to make an accurate record of the workman's unproductive time as well as a record of the time when he is not actually present at his place in the factory. In these records, intervals of elapsed time are represented by intervals of space measured longitudinally of the tapes. During the working hours of the day, the two tapes are continuously fed at a predetermined speed having a definite relation to elapsing time. Hence a given lineal measurement of tape represents a certain period of elapsed time. Now, since there is a certain definite relation between time and cost, represented in the case of the workman's time, for example, by the wage rate or amount of compensation per hour, each interval of time represented by the record may in itself represent the wage cost, since it is translatable into terms of money by simply using a linear scale whose units represent units of money.

In the use of the recording machine which forms the subject matter of my present application, it is intended that the electric circuit shall be complete only during the stated hours of labor. During such time, the record-receiving tapes are being fed each at a uniform speed. The workman places his key in the machine when he reaches his place at the beginning of a stated work period, and removes the key when he leaves his place at the close of the work period. In each case, he operates the machine to score upon the tapes a datum line and to print his personal identification number at the time of insertion or withdrawal of the key, and hence the record represented by the interval between these two lines represents the time he is actually at his place. During this time, the tapes are traveling along ready to receive records from time to time.

When the workman is given a certain job to do, that job is assigned an arbitrary number or other symbol and he is furnished with a tag or card which, if desired, may bear the job number. He at once places this tag or card in the machine, and turns the crank one revolution. By this simple act, he causes the machine to operate in the manner already described, to print the workman's number, the job number, and score a datum line upon both tapes simultaneously. The datum line is scored between the workman's number and the job number. The direction in which the tapes are fed is such that the workman's number is printed upon a stretch of tape forming a part of the previous record, while the job number with the adjacent datum line marks the beginning of a record connected with the job he is to start upon. This record, having been thus begun, the operator starts upon the job, and while he is at work upon the same, the tapes are being fed along at a predetermined speed relative to elapsing time. Another factor, the value of which may be varied by a proper selection of gear wheels, helps to determine the speed. This factor in one case is wage cost per unit of time and in the other total cost per unit of time. The speed of a given tape therefore is, mathematically expressed, a function of the time and of a certain cost rate. When the job is completed, the workman turns it in with its tag or card, gets a new job with its tag or card, places the latter in the machine, and turns the crank as before, thus printing the new job number, scoring the datum line and printing his number. There now exists within the machine a record representing the elapsed time for the completed job, such record consisting of two stretches of tape bounded at each end by a datum line and having the job number adjacent one end, and the workman's number adjacent the other end. One of these stretches of tape is longer than the other, and represents the total cost incident to the work performed upon the article, while the other represents the wage cost. The latter may serve as a basis for determining what compensation the workman is entitled to, while the former, when mounted upon a suitable scale, may serve as a permanent record of the total cost of performing the work upon the job.

It sometimes happens that for one reason or another, there will be some unproductive time during the working day,—that is to say, not all of the working day is chargeable to any job or jobs. For example, if any accident should happen to the machine upon which the workman is working, and in consequence he is obliged to stop work on his job, such time is not properly chargeable to that job. Hence it is desirable to make a record of the unproductive time occasioned by the accident. To this end, the workman may be provided with a tag or card perforated in such a manner as to cause the machine to print a certain number or other symbol indicating the nature or cause of the unproductive time. The workman puts this tag or card into the machine, turns the crank one revolution as before, and there is scored upon the tapes a datum line and a number or symbol marking the beginning of a period of unproductive time. When the workman is enabled to begin once more upon the job in hand, he inserts the job tag or card in the machine once more, and operates the machine as before to score a new datum line and again print the job number, thus recording upon the tapes the end of the unproductive period of time and the commencement of productive time.

These recording operations are semi-automatic,—that is to say, they require nothing more than the mere insertion of the tag or card, and the turning of the crank, an operation which takes but a moment of the workman's time, and requires no figuring, writing, or mental effort of any kind, except that necessary to insert the tag or card and turn the crank. He cannot turn the crank too far by mistake, because the lock must be operated each time to release the mechanism, thereby to permit the crank to be turned.

The recording mechanism is all inclosed, and hence inaccessible to the workman, so that not only is he prevented from tampering with the machine, but, in addition, he can see nothing which will give him any indication of the amount of time recorded against a certain job. In this way, he is prevented from attempting to always do a certain kind of job in a certain length of time; moreover, since the machine is automatic, as well as having its record invisible, the workman cannot shift time from one job to another, as is possible in the use of other systems.

The rewinding of the power spring takes place automatically during a registering operation, so that the workman winds the spring without giving it any thought whatever.

I claim—

1. In a cost recording machine for use with two record-receiving elements, the combination with means for feeding both of said elements in accordance with the time elapsing during the various periods to be measured, the two elements being fed at different speeds to correspond to different rates of time cost assigned thereto, of means for marking on said elements the beginning and ending of a time period to represent by the length indicated thereon when the same is applied to a common value scale the time cost of such period at the given rate.

2. In a cost recording machine for use with two record tapes, the combination with means for feeding said tapes in accordance with elapsing time, said tapes being fed at different speeds to correspond to different rates of time cost, and a single means for simultaneously indicating on the tapes the amount fed in any given time period.

3. In a cost recording machine for use with two record-receiving elements, the combination with means for feeding both of said elements in accordance with the time elapsing during the various periods to be measured, the two elements being fed at different speeds corresponding to different rates of time cost assigned thereto, means for marking on said elements the beginning and ending of a time period to denote cost, and means for impressing upon each of said elements a symbol identifying such record of cost, whereby the records relating to the same job either on the same recording element or on both elements may be identified.

4. In a recording machine, for use with a record-receiving element; the combination of means for imparting a feeding movement to said element; a plurality of recording elements; instrumentalities for selecting and arranging certain of said recording elements according to a predetermined arrangement, said instrumentalities including a perforated controlling element, a plurality of devices adapted to enter perforations in said controlling member, means to determine the extent to which said devices shall enter into said perforation; and means to cause said recording elements to make a record in or upon said record-receiving element.

5. In a recording machine, for use with a record-receiving element; the combination of means for imparting a feeding movement to said element; a plurality of recording elements; instrumentalities for selecting and arranging certain of said recording elements according to a predetermined arrangement, said instrumentalities including a perforated controlling element, a plurality of devices adapted to enter perforations in said controlling member, means to cause said members to be carried along the face of said controlling element, means to cause such of said devices as encounter perforations in said controlling element to enter the same, and means to stop certain of said devices at different points in their travel from their initial position into said perforations; and means to cause said recording elements to make a record in or upon said record-receiving element.

6. In a recording machine, for use with a record-receiving element; the combination of means for imparting a feeding movement to said element, a plurality of typed wheels having types thereon, pinions secured to said wheels, respectively, racks meshing with said pinions, respectively, slides on which said racks are carried, selectors mounted on said slide, means provided with perforations to receive said selectors, means to move said selectors transversely of said racks, means to cause certain selectors to enter certain selected perforations, means to determine the extent to which said selectors shall enter said perforations thereby to determine which types shall be brought to the printing point, and means to cause such types to print upon said record-receiving element.

7. In a recording mechanism, for use with a record-receiving element; the combination of means for imparting a feeding movement to said element; a plurality of recording elements; instrumentalities for selecting and arranging said recording elements according to a predetermined arrangement, said instrumentalities including a plurality of selectors, means provided with a plurality of perforations to receive selectors, means to cause said selectors to travel across the plane of the entrances of said perforations, means to cause such of said selectors as encounter open perforations to enter the same, and means to determine the extent to which said selectors shall enter such perforations; and means to cause said recording elements to make a record upon said record-receiving element.

8. In a recording mechanism, for use with a record-receiving element; the combination of means for imparting a feeding movement to said element; a plurality of recording elements; instrumentalities for selecting and arranging said recording elements according to a predetermined arrangement, said instrumentalities including a plurality of selectors, means provided with a plurality of perforations to receive selectors, means to cover certain predetermined perforations while leaving others open for the entrance of selectors, means to cause said selectors to travel across the plane of the entrances of said perforations, means to cause such of said selectors as encounter open perforations to enter the same, and means to determine the extent to which said selectors shall enter such perforations; and means to cause said recording elements to make a record upon said record-receiving element.

9. In a recording machine, for use with a record-receiving element; the combination of means for imparting a feeding movement thereto; a type-wheel having a plurality of types thereon; instrumentalities for rotating said type-wheel to bring a certain type to a printing position, said instrumentalities including a selector, means providing a series of openings to receive said selector, a controlling member provided with a perforation registering with one of said openings, means to move said selector across said controlling member to bring said selector into register with said perforation, means to cause said selector to enter said perforation, and means to determine the extent to which said selector shall enter said perforation; and means to cause said type to print upon said record-receiving element.

10. In a recording machine, for use with a record-receiving element; the combination of means for imparting a feeding movement thereto; a plurality of type-wheels each having a plurality of types thereon; instrumentalities for rotating said type wheels to bring a selected type or group of types to a printing position, said instrumentalities including a plurality of selectors, means providing a plurality of series of openings to receive said members, a controlling member provided with one or more perforations placed according to some arbitrary arrangement and registering with a corresponding opening or openings, means to move said selectors across the face of said controlling member to bring a certain selector or selectors into register with a certain perforation or perforations, means to cause such selector or selectors to enter such perforation or perforations, and means to determine the extent to which said members shall enter into said perforations.

11. In a recording machine, the combination with a record receiving element of a plurality of type members each bearing a plurality of symbols adapted for individual presentation to said element, means for arranging a combination of said symbols comprising a plurality of selectors movable through a series of positions and each adapted for selective action in any of the said positions, a given selector in a given position determining the presentation of one symbol of one type member, and a controlling member to allow selective action of predetermined members in predetermined positions.

12. In a recording machine for use with a continuous receiving strip, the combination with mechanism for feeding said strip at a rate corresponding to a rate of time cost assigned thereto, said machine including an impelling spring and an escapement controlling the feed of said strip, a manually operated marking device to mark said strip to denote thereon the end of any time period, and means set in operation by said marking device for restoring potential energy to said spring.

13. An apparatus of the character described comprising, in combination, a record-receiving element, means including a spring for imparting a feeding movement to said element, a manually operable actuating device, means operated by said device for printing upon said element, and means also operated by said device for flexing said spring.

14. An apparatus of the character described, comprising, in combination, a record-receiving element, means including a spring for imparting a feeding movement to said element, a manually operable actuating device, means operated by said device for marking said element, spring flexing means also operated by said device, and means under the control of said spring for rendering said flexing means ineffective.

15. An apparatus of the character described comprising, in combination, a record receiving element, a device possessing potential energy to impart a feeding movement to said element, and means for simultaneously making a record upon said element and restoring potential energy to said device.

16. In a time recording machine for use with two record-receiving elements, the combination with means for feeding both of said elements in accordance with the time elapsing during the various periods to be measured but at different rates, of means for marking on said elements the beginning and ending of a time period.

17. A recording machine for use with two record-receiving elements, having means for indicating on each the beginning of a time period, means for independently feeding them with reference to the indicating means, and means for changing the rate of feed of one independently of the other.

18. In a time cost system, the combination with a recording machine for use with two record-receiving elements and having means for feeding both said elements in accordance with the time elapsing during the various periods to be measured, the two elements being fed at different speeds to correspond to different rates of time cost assigned thereto, said machine having also means for marking on said elements the beginning and ending of a time period, of a common linear value scale whereon the linear dimension of each record represents a certain time cost value irrespective either of the elapsed time or the time cost rate.

19. The combination of a plurality of measuring devices having each means for holding a plurality of record surfaces, a dimension-determining means, automatic clock-controlled feeding means for causing a relative movement between each record surface and the dimension-determining means in accordance with elapsing time, the rate of feed in each record surface being fixed with reference to a particular time cost rate assigned thereto, and a common linear scale of money value whereon the marked off lengths of said record surfaces will denote the time cost of the corresponding operation irrespective of elapsed time alone or the time cost rate.

20. The combination with a plurality of measuring devices each comprising a casing, means for holding a plurality of record tapes in each casing, means for feeding said record tapes each in accordance with elapsing time and at a rate selected with reference to a characteristic rate of time cost, a common printing or marking mechanism for indicating the beginning of a time period upon both tapes and for simultaneously placing on both tapes also the same identifying symbol, and a common linear scale of money value whereby said records when measured will indicate the time cost of the corresponding operation irrespective of elapsed time alone or time cost rate alone, and whereby the records bearing the same identifying symbol either on the same tape or on both tapes may be identified.

21. A time cost meter having means for holding a plurality of record tapes, a tape feeding member for each, a common driving shaft, clock-controlled means for turning said driving shaft at a uniform rate proportional to elapsing time, and change speed gearing between the driving shaft and each tape feeding member comprising a driven gear for the tape feeding member, a change gear on the driving shaft and an intermediate gear between the change gear and the feeding gear whereby the feed of each tape may be adjusted to different rates.

22. A time cost meter having means for holding a plurality of record tapes, a tape feeding member for each, a common driving shaft, clock-controlled means for turning said driving shaft at a uniform rate proportional to elapsing time, and change speed gearing between the driving shaft and each tape feeding member comprising a driven gear for the tape feeding member, a change gear on the driving shaft and an intermediate gear between the change gear and the feeding gear whereby the feed of each tape may be adjusted to different rates, and means for indicating on each tape the beginning of a time period.

23. A time cost meter having means for holding a plurality of record tapes in superimposed relation, a tape feeding member for each, a common driving shaft, clock-controlled means for turning said driving shaft at a uniform rate proportional to elapsing time, and change speed gearing between the driving shaft and each tape feeding member comprising a driven gear for the tape feeding member, a change gear on the driving shaft, an intermediate gear between the change gear and the feeding gear whereby the feed of each tape may be adjusted to different rates, and common marking mechanism for simultaneously indicating on the two tapes the beginning of the time period.

24. A recording machine for use with two record receiving elements, having common means for simultaneously indicating on each of said elements the beginning of a time period, and means for feeding the two elements with reference to the indicating means at uniform but different speeds, thereby to form time records of different dimensions.

25. The combination of a plurality of measuring devices, each provided with means for holding a plurality of record tapes one superimposed on the other, common marking mechanism for simultaneously indicating on the two tapes the beginning of a time period, and also for placing identification marks on each tape, automatic clock-controlled feeding means for causing relative movement between the tapes and the marking mechanism in accordance with elapsing time, the rate of feed in each case being fixed with reference to a characteristic rate of time cost assigned to the particular tape whereby the two tapes may be fed at different rates of speed, and a common linear scale of money value.

26. A recording machine for use with two record-receiving sheets held in superimposed relation having, a platen, printing means, time-controlled means for feeding the two sheets in superimposed relation between the platen and printing means at uniform but different rates of speed, and means for actuating said printing means to simultaneously mark on said sheets the beginning of a time period.

27. A recording machine having two record receiving sheets held in superimposed relation, ink transfer means in contact with each sheet, a platen, printing means, time-controlled means for feeding the two sheets in superimposed relation between the platen and printing means at uniform but different rates of speed, and means for actuating said printing means to simultaneously mark on said sheets the beginning of a time period.

28. In a unit time cost system the combination of a plurality of measuring devices having each means for holding a record surface, a marker to mark the beginning of a time period on each surface, means for feeding each surface whereby the latter may be moved relatively to the marker proportionately both to elapsed time and time cost, whereby the length of each sub-division marked on the surface represents on a linear multiple rate scale a certain time cost value irrespective either of the elapsed time or the time cost rate associated therewith, and means for indicating on the length of surface representing any given time period the job to which it pertains, whereby sub-divisions taken from different devices or from different portions of the same surface, but relating to the same job, may be identified and aggregated, and their aggregate length applied to said scale to determine the total time cost of that job.

29. In a unit time cost system the combination of a plurality of measuring devices having each means for holding a record surface, a marker to mark the beginning of a time period on each surface, means for changing each surface whereby the latter may be moved relatively to the marker proportionately both to elapsed time and time cost, whereby the length of each sub-division marked on the surface represents on a linear multiple rate scale a certain time cost value irrespective either of the elapsed time or the time cost rate associated therewith, a job indicating member removable from the machine and adapted to accompany the material on which the work is performed, and mechanism embodied in the machine adapted to coöperate with the said indicating member for placing on the length of record surface representing the time period, a symbol representing the job to which it pertains, whereby sub-divisions taken from different devices or from different portions of the same surface, but relating to the same job, may be identified and aggregated, and their aggregate length applied to said scale to determine the time cost of the job.

30. In a unit time cost system the combination of a plurality of measuring devices having each means for holding a record surface, a marker to mark the beginning of a time period on each surface, means for feeding each surface whereby the latter may be moved relatively to its marker proportionately both to elapsed time and time cost, whereby the length of each sub-division marked on the surface represents on a linear multiple rate scale a certain time cost value irrespective either of elapsed time or the time cost rate associated therewith, a job indicating member removable from the machine and adapted to accompany the material on which the work is performed, and mechanism embodied in the machine and adapted to coöperate with said indicating member for simultaneously applying said marker to the record surface representing the time period a symbol representing the job to which it pertains and for applying to the said surface a symbol identifying the workman, whereby sub-divisions taken from different devices or from different portions of the same surface, but relating to the same job, may be identified and aggregated and their aggregate length applied to the said scale to determine the time cost of that job, and whereby the workman for each time period may be separately identified.

31. In a recording machine for producing a sectional record strip, the combination with strip feeding mechanism adapted to feed a continuous strip of recording material progressively with elapsing time but at a speed to correspond to a time cost rate assigned thereto, recording mechanism with relation to which said strip is fed, said recording mechanism being adapted to mark on said element the beginning and ending of a given time period whereby the length indicated thereon will represent the time cost of such period at the given rate when the marked off length is applied to a common value scale, manually actuated means for operating said recording mechanism to mark said strip from time to time as required, thereby to produce a continuous record, sections of which from time to time may be separated from the continuous strip and withdrawn from the machine, an impelling spring for operating the strip feeding mechanism, an escapement controlling the feed, and a spring flexing device for restoring energy to the spring connected to be operated by a manually performed act in producing the sectional record strip.

32. In a recording machine for producing a sectional record strip, the combination with strip feeding mechanism adapted to feed a continuous strip of record material progressively with elapsing time, recording mechanism with relation to which said strip is fed, manually actuated means for operating said recording mechanism to mark said strip from time to time as required with symbols pertaining to the different time periods thereby to produce a continuous record, sections of which from time to time may be separated from the continuous strip and withdrawn from the machine, a source of feeding energy for the strip feeding mechanism, and means for restoring energy to said source, said means being adapted to be operated by a manually performed act in producing the sectional record strip.

33. In a recording machine, the combination with means for holding a plurality of record sheets, means for marking on each sheet the beginning of a time period, a feeding member for each sheet for accurately feeding and measuring each proportionate to elapsed time, and clock controlled means for turning said members at different rates of speed.

34. In a time recording machine for use with two record tapes, the combination with means for feeding said tapes in superimposed relation in accordance with elapsing time but at different rates of speed, of means for marking on said tapes the beginning and ending of a time period.

In testimony whereof, I have signed my name to this specification, in the presence of two subscribing witnesses.

JOHN T. QUIGLEY.

Witnesses:
  HORACE A. CROSEMAN,
  LOUIS A. JONES.

It is hereby certified that the assignee in Letters Patent No. 1,249,192, granted December 4, 1917, upon the application of John T. Quigley, of Boston, Massachusetts, for an improvement in "Recording-Machines," was erroneously described and specified as "The Costmeter Company," whereas said assignee should have appeared as *Costmeter Company*, as shown by the records of assignments in this office; and that the said Letters Patent should be read with this correction therein that the same may conform to the record of the case in the Patent Office.

Signed and sealed this 12th day of February, A. D., 1918.

[SEAL.]

J. T. NEWTON,
*Commissioner of Patents.*

Cl. 234—53.